United States Patent
Hasler et al.

(10) Patent No.: US 9,728,962 B2
(45) Date of Patent: Aug. 8, 2017

(54) APPARATUS FOR FILTERING HARMONICS IN RAILWAY CONTACT LINES AND METHOD

(71) Applicant: ABB Technology Ltd, Zürich (CH)

(72) Inventors: Jean-Philippe Hasler, Västerås (SE); Mauro Monge, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 14/443,284

(22) PCT Filed: Nov. 15, 2012

(86) PCT No.: PCT/EP2012/072780
§ 371 (c)(1),
(2) Date: May 15, 2015

(87) PCT Pub. No.: WO2014/075732
PCT Pub. Date: May 22, 2014

(65) Prior Publication Data
US 2015/0333612 A1    Nov. 19, 2015

(51) Int. Cl.
*H02M 7/48*    (2007.01)
*H02J 3/01*    (2006.01)
(Continued)

(52) U.S. Cl.
CPC ............... *H02J 3/01* (2013.01); *H02M 1/12* (2013.01); *H02M 7/483* (2013.01); *H02M 7/493* (2013.01); *H02M 2007/4835* (2013.01)

(58) Field of Classification Search
CPC .. H02J 3/1857; H02J 3/01; H02J 3/16; H02M 1/12; H02M 2001/123; H02M 7/483;
(Continued)

(56) References Cited

U.S. PATENT DOCUMENTS 5,532,575 A    7/1996   Ainsworth et al.
6,075,350 A *   6/2000   Peng ..................... H02J 3/1814
                                                               323/207
(Continued)

FOREIGN PATENT DOCUMENTS

WO   WO 2010/145706 A1   12/2010
WO   WO 2011/127980 A1   10/2011

OTHER PUBLICATIONS

Fioretto et al, "Multilevel Harmonics Current Active Compensator for DC Feeding Line", IEEE AFRICON, Sep. 23-25, 2009, pp. 1-6, p. 1-p. 4; figures 3, 4, 8.
(Continued)

*Primary Examiner* — Alex Torres-Rivera
(74) *Attorney, Agent, or Firm* — Birch, Stewart, Kolasch & Birch, LLP

(57) ABSTRACT

An apparatus and a method for filtering harmonics in a power transmission contact line of a railway system includes a multilevel converter multilevel converter having one single phase leg, which phase leg comprises switching cells, each switching cell comprises semi-conductor switches arranged to selectively provide a connection to a corresponding energy storage element. The multilevel converter also includes a controller provided to control the switching of each switching cell, and wherein the phase leg is configured in two parallel branches of cascaded switching cells, which branches is interconnected in a closed circuit. The controller is provided to monitor the content of harmonics in the contact line, and is adapted to filter the monitored harmonics by means of adapting the switching of the switching cells to absorb the harmonics.

17 Claims, 4 Drawing Sheets

(51) Int. Cl.
*H02M 1/12* (2006.01)
*H02M 7/483* (2007.01)
*H02M 7/493* (2007.01)

(58) Field of Classification Search
CPC ....... H02M 2007/4835; H02M 7/5387; H02M 7/493; Y02B 70/12; Y02B 70/126
USPC .................. 363/71, 95, 97, 98, 131, 132
See application file for complete search history.

(56) References Cited

U.S. PATENT DOCUMENTS

| | | | | |
|---|---|---|---|---|
| 6,088,245 A * | 7/2000 | Ainsworth | ............ | H02J 3/1857 363/39 |
| 2008/0007974 A1 * | 1/2008 | Ponnaluri | ............... | H02M 1/12 363/20 |
| 2009/0196078 A1 * | 8/2009 | Gruber | ................. | H02M 7/483 363/36 |
| 2011/0013441 A1 * | 1/2011 | Gruber | .................... | H02M 1/36 363/154 |
| 2012/0068555 A1 | 3/2012 | Aiello et al. | | |
| 2012/0069612 A1 | 3/2012 | Hasler | | |
| 2012/0112545 A1 * | 5/2012 | Aiello | .................... | H02M 7/49 307/65 |
| 2013/0128635 A1 * | 5/2013 | Korn | ....................... | H02H 7/10 363/50 |
| 2013/0181532 A1 * | 7/2013 | Kjær | ...................... | H02M 1/34 307/82 |
| 2014/0049230 A1 * | 2/2014 | Weyh | ................... | H02M 7/483 323/207 |
| 2014/0103887 A1 * | 4/2014 | Akagi | .................. | H02J 3/1857 323/207 |
| 2014/0146586 A1 * | 5/2014 | Das | ......................... | H02M 1/36 363/49 |

OTHER PUBLICATIONS

Lee et al., "The high power active filter system for harmonic compensation of electric railway", (Order No. T4.3.1.1), Proceedings of the 7th World Congress on Railway Research (WCRR), Montreal, Canada, Jun. 4-8, 2006.

Tan et al., "Application of Multilevel Active Power Filtering to a 25kV Traction System", Australasian Universities Power Engineering Conference (AUPEC), Monash University, Melbourne, Sep. 29-Oct. 2, 2002.

Waware et al., "Artificial Neural Network Controlled Multilevel Inverter based Active Power Filter for High Voltage Systems", ELEKTRIKA, 2011, vol. 13, No. 2, pp. 21-30.

Yu, "Research on the Technology of Power Filter and Compensation System for High Speed Maglev System", The 21st International Conference on Magnetically Levitated Systems and Linear Drives, Daejeon, Korea, Oct. 10-13, 2011.

* cited by examiner

APPARATUS FOR FILTERING HARMONICS IN RAILWAY CONTACT LINES AND METHOD

TECHNICAL FIELD

The invention relates to filtering harmonics in electrical power systems, and which employs a multilevel converter having switching cells consisting of semiconductor switching circuits and energy storage elements, such as capacitors. Especially, the invention relates to multilevel inverters (or converters) having a single phase and which inverter is equipped with means being arranged to compensate for harmonics in railway contact lines.

BACKGROUND AND PRIOR ART

The invention relates to the field of voltage source converters and especially single phase multilevel converters adapted for compensating for harmonics in railway contact lines. Voltage source converters (VSC) using power electronics including semiconductor switching elements that can be turned off, such as IGBTs (Insulated Gate Bipolar Transistors) have found great use for DC transmission, reactive power compensation, control of active as well as reactive power, being able to create AC voltage out of DC voltage by means of switching control, and for converting AC to DC etcetera.

The multilevel converter technique, employing many voltage levels, wherein each voltage level being individually switched, can be used to create AC voltage from DC in small voltage steps providing a stepped voltage curve much closer to a sinus curve than the previous use of two level and three level converters. The DC voltage can be provided by energy storage means consisting of capacitors, but may also be batteries.

A single phase multilevel converter may be used for reactive power compensation in the contact lines of AC railway systems but the locomotives of the trains generate harmonic currents in the electric system of the railway. Such harmonics can be reduced by harmonic filters, but such harmonic filters weaken the system and may create resonance problems and enhance the voltage in a non-load condition.

As a background some prior art documents (D1-D5) will be discussed in the following. First three documents mainly dealing with three-phase systems (D1-D3), followed by two documents (D4-D5) describing single-phase systems for railway applications. It should be noted that this discussion of prior art documents have been made with knowledge of the present invention and the interpretation of these documents may therefore include novel features. A purpose of the discussion is to describe how systems can be built, especially as they hitherto have been built.

U.S. Pat. No. 6,088,245 (D1) describes a switching control arrangement for multilevel converters that counteract the harmonic content of the converter voltage or current by controlling the switching pattern of the switching devices, e.g. GTO's (see abstract), which switching devices are associated with DC energy sources, or DC sink and source means. Especially, the switching pattern is changed by modifying the timing of the switching of the switching devices (see claim 2 in column 13). The switching of the switching devices provides an output from the multilevel converter, which when connected to the power system, reduce the harmonic distortion of the AC power in the power system.

U.S. Pat. No. 5,532,575 (D2) describes a multilevel converter with means for balancing voltages of capacitors of the converter. D1 describes a multilevel converter primarily intended for use as a static VAr compensator (column 1, line 5-8). The multilevel converter includes three legs, one for each phase, of switching elements (GTO's 30, see FIG. 1), which switching elements (GTO's) are connected to tapping points of capacitors 20 (column 1, line 28-34). The multilevel converter also includes a control system 60 (column 7, line 48-65) that controls the switching of the GTO's. The control system monitors the voltages of the capacitors and (see column 8 line 32-64) if a voltage level of a capacitor is too high or too low, the control system (see abstract) adjusts the timing of the switching of those capacitors that have too low or too high voltage level, but do not change the switching timing of those capacitors that do not deviate. In this way the voltages of those capacitors that do not deviate is not affected (column 8, line 39), whereas the voltages of the deviating capacitors are balanced.

Thus, apart from compensating for reactive current in a transmission line, document D1 and D2 describes two different goals achieved by adjusting the timing of the switching of the switching devices of a multilevel converter, i.e. balancing capacitor voltages and reducing harmonics, respectively. In the multilevel converters described in D1 and D2, the three phases have common energy storage elements, i.e. the three phases share capacitors.

Another known type of multilevel converters, are cascaded multilevel converters having a semiconductor switching element in each switching cell circuit having a half bridge or full bridge configuration. For example, two IGBTs are used in each switching cell in a half bridge configuration with a DC capacitor as energy storage element, and each IGBT is arranged in anti-parallel with its own diode.

In such multilevel converters that have separate energy storage elements for each phase, e.g. capacitors that belong to one phase, sharing of energy between the capacitors within a phase leg, or between capacitors of different phase legs, is difficult to achieve without affecting the power that is transferred to the power network.

A solution to this balancing problem exists for three phase inverters. Document WO2010/145706 (D3) provides a solution for balancing voltages of the energy storage elements of a delta connected multilevel converter, having serially connected switching cells with a corresponding energy storage element, arranged in three phase legs. In more detail, D3 describes a multilevel converter having delta connected phase legs and wherein the DC voltages of the switching cells of each of the phase legs are balanced by means of a balancing current circulating between the phase legs, and distributing energy between the energy storage elements of the phase legs. D3 describes an arrangement for exchanging power in a shunt connection with a three phase power network, which arrangement comprises a voltage source converter having three phase legs in a delta connection, wherein each leg comprises a series of switching cells (see abstract of D3). The electrical conditions of the three phases of the power network and the converter are measured and a control unit (19) is configured to determine if the phases are unbalanced. The control unit (19) determines a zero sequence current that indicates such an unbalance and uses this determined zero sequence current to control the switching cells to add a circulating current to the currents in the phase legs to counteract such an unbalance (see claim 1 of D3). The circulated current is driven inside the delta of the converter legs and moves energy inside the delta, between the legs without negatively affecting the power network, and avoids creating harmonics in the power network (see D3 page 4, lines 24-29).

In such a delta connected multilevel converter the phase legs handles the phase voltage and comprises a sufficient number of levels to handle the voltage level between the phases.

A multilevel converter having a single phase leg that use currents to move energy between the energy storing elements affects the power transmission network or contact line of a railway, because the leg do not provide a closed circuit like the phase legs in a delta connected multilevel converter do.

Tan, P. C. et al. "*Application of multilevel active power filtering to a 25 kV traction System*", Australasian Universities Power Engineering Conference (AUPEC), Monash University, Melbourne, Sep. 29-Oct. 2, 2002 (D4 or Tan 2002) describes filtering of harmonics in single phase railway power systems.

Section 2 of D4 discusses four classes of multilevel inverter topologies; diode-clamped, flying-capacitor, cascaded H-bridges and hybrid inverters. Each of these inverters are combined with a passive filtering of harmonics.

Section 3 of D4 suggests using a hybrid inverter for active filtering of harmonics, which hybrid inverter (paragraph 3.1 and FIG. 2) is used to provide reactive power compensation and harmonic compensation (of the 3rd, 5th and 7th harmonics). FIG. 2 also describes a DC bus voltage control that maintains a constant voltage of the DC bus.

Thus, D4 describes using a power control system for a railroad including a multilevel converter of a hybrid class type adapted both for active filtering of harmonics and reactive power compensation, and which power system compensates the DC voltage level in the DC bus of the multilevel converter.

D4 do, however, not describe if or how any of the remaining three types of multilevel inverter topologies; diode-clamped, flying capacitor or cascaded H-bridges can be used for active filtering.

Lee Y. K. et al. "*The High Power Active Filter System for Harmonic Compensation of Electric Railway*", (Order no. T4.3.1.1), Proceedings of the 7th World Congress on Railway Research (WCRR), Montréal, Canada, Jun. 4-8, 2006 (D5 or Lee 2006) describes filtering of harmonics. D5 suggests (see abstract and introduction) using a cascaded multilevel H-bridge inverter for active filtering of harmonics in an electric power system of a railway.

D5 combines passive filtering of the 3rd and 5th harmonics (§2.2 and FIG. 5) with active filtering of higher harmonics by means of the multilevel converter. D5 do not describe compensation of DC voltages.

A problem that may arise when such an H-bridge inverter or converter, having capacitors isolated from each other by switching means, is used for filtering harmonics, which harmonics are received through the energy storing capacitors, is that the voltage over individual energy storing capacitors become too large or too low. Such voltage imbalances cannot be compensated for without adding current to the contact line. During time periods when there is no need for power compensation e.g. when no train is supplied with energy from the contact line, the voltage levels of the capacitor cannot be balanced without simultaneously inducing a current in the contact line.

D5 do not address the problem of balancing DC voltage levels, and therefore do not describe how such DC voltages can be adjusted. In the system of D5 it is presumably possible to balance the DC voltage levels of the capacitors by creating a current from the capacitors of the converter to the passive filter, so that no current needs being transferred further along the contact line.

SUMMARY OF INVENTION

It is an object of the invention to overcome the shortcomings of the prior art and to provide active filtering of harmonics in a single phase system by means of a cascaded multilevel converter.

It is also an object to provide such filtering without the need for passive filters.

It is also an object to provide a single phase converter, wherein the voltage levels of the energy storage elements of the switching cells can be balanced without introducing unnecessary currents in electric transmission and contact lines of the railway It is a further object to provide such active filtering of harmonics and being able to balance the voltage levels of individual energy storage elements by moving energy between the energy storage devices of the single phase leg without introducing unnecessary currents in the electric power transmitting contact line of the railway.

For these purposes, the present invention provides an apparatus for filtering harmonics in a power transmitting contact line of a railway. The apparatus comprising a multilevel converter being a single phase converter with one single phase leg, which phase leg comprises switching cells. Each switching cell comprises semi-conductor switches arranged to selectively provide a connection to a corresponding energy storage element. The apparatus also includes a controller provided to control the switching of each switching cell. The apparatus is characterized in that the phase leg is configured with two parallel branches of cascaded switching cells, the branches being interconnected, directly with each other, in a closed circuit, and the controller is provided to monitor the content of harmonics in the contact line, and which controller is also provided to filter the monitored harmonics by means of adapting the switching of the switching cells to absorb the harmonics.

Preferably the phase leg comprises switching cells in many levels, e.g. more than five levels, preferably seven, nine, eleven or more levels.

Preferably, the semi-conductor switching elements constitute IGBTs, and are arranged to selectively provide a connection to a corresponding energy storage element being a capacitor or a battery.

Preferably, the controller is provided to control the switching, by means of firing commands to the semiconducting switches of the cells.

In a preferred embodiment, the converter is a single phase converter being adapted for rail way application, especially being arranged at a rail way for power conversion in a rail way application, wherein a common output of the two branches is connected to the contact line of the railway.

The single phase leg preferably comprises a ground connection, opposite the output for the contact line connection, and the two branches are joined at the ground connection, providing a closed circuit from ground, through the first branch, the output for the contact line connection, through the second branch back to the ground connection.

In an embodiment, the controller is adapted to monitor the voltage levels of each energy storage element and is adapted to transfer energy between the energy storage devices by controlling the switching of the switching cells in dependence of the voltage levels to compensate for voltage unbalances.

Preferably, the controller is adapted to create a circulating current in the branches of the phase leg for effectuating the energy transfer. Especially, the controller is adapted to effectuate the transfer of energy between the energy storage devices by individually varying the switching of the switching cells.

In an embodiment, the multilevel converter is adapted to compensate for reactive power in the contact line, and is adapted to maintain the supply of reactive power during the harmonics filtering.

In an embodiment, the controller is adapted to monitor the harmonics content in the contact line by applying a Park's or dq-transform to a measured voltage or current signal.

In an embodiment, the controller is adapted to employ an invers Park's or invers dq transform to provide a switching control signal for filtering the monitored harmonics.

In an embodiment, the energy storage device of at least one the switching cell is a capacitor, preferably the energy storage devices of a majority of the switching cells of each branch are capacitors, such as every energy storage device is a capacitor.

In an embodiment, each switching cell comprises a full H-bridge with four semiconductor switching elements, preferably IGBTs, connected to the energy storage element.

In an alternative embodiment, each switching cell comprises a half-bridge with two semiconductor switches, preferably IGBTs, connected to the energy storage element.

Having two parallel branches with a common output and common ground connection makes it possible to balance the voltages of the energy storage devices by means of circulating a current in the two branches without affecting the power that is supplied to the power transmitting contact line of the railway.

When balancing the DC voltage levels of the energy storage devices, the circulating current, of a preferred embodiment, is created as an idle current and is kept circulating also when no unbalances exist. The circulating current is created by means of switching the switching cells, and the transfer of energy being effectuated by individually varying the switching of the switching cells. Especially, the controller is adapted to effectuate the transfer of energy by individually varying the switching of the switching cells, and keeping the circulating current circulating simultaneously.

It is preferred that the energy storage devices used are capacitors, or at least that a majority of the switching cells of each branch are capacitors and at least one being a battery. Alternatively, the energy storage devices are batteries, or at least a majority of the energy storage devices are batteries.

The invention also provides a method for controlling a single phase multilevel converter connected to a railway power transmission and contact line, the multilevel converter comprising one phase leg, which phase leg comprises switching cells, each switching cell comprising semi-conductor switches arranged to selectively provide a connection to a corresponding energy storage element, and the phase leg comprises two parallel branches of switching cells sharing an output that is connected to the contact line. The method includes monitoring the harmonics content in the contact line, and compensating for the harmonic content by controlling the switching of the switching cells.

I an embodiment, the monitoring of harmonic content includes employing a Park's transform for identifying the size of each harmonic. Especially, each harmonic is quantified from the measured and digitalised current, or voltage, of the contact line by means of a Park's transformation. In an embodiment, the Park's transform is employed on one harmonic at a time, all harmonics in sequence, each being quantified so that a counteracting current signal of the harmonic can be created. When all harmonics have been quantified, a counteracting current signal is created in the compensating step, which compensating includes applying an invers Park's transform to create the control signal for the switching of the multilevel converter.

In an embodiment the control method also includes monitoring the voltage levels of each of the energy storage elements, and includes balancing the voltages of the energy storage elements, which balancing includes circulating a current within the two branches of switching cells, especially cascaded H-bridge switching cells.

In an embodiment the control method also includes monitoring the reactive power of the contact line, and compensating for the reactive power in the contact line by switching the cells to supply a current to the contact line.

In an embodiment the method further includes creating a circulating current in the two branches, and wherein the balancing includes modifying the circulated current to transfer energy between the storage elements of at least two switching cells, especially upon detecting, when monitoring of voltages that at least one voltage deviates. A fast balancing can be achieved by circulating a current during normal operation and when unbalances occur the switching is adjusted whereby the circulating current is adjusted to balance the energy storage elements by a net transfer of energy to or from the deviating element.

Preferably, the filtering and/or the balancing are maintained during the step of supplying a reactive power compensating current. It is thus possible to filter harmonics in the contact line, balance the capacitors of cascaded H-bridge switching cells, and compensate the reactive power of the contact line simultaneously and by means of a multilevel converter in accordance with the invention.

Basically, the control signals to the switching cells are adapted so that the supplied current, the circulating current, and the harmonics counteracting current are superimposed.

SHORT DESCRIPTION OF THE FIGURES

The invention will in the following be described in more detail with reference to the accompanying drawings, which are illustrating the invention for facilitating performing the invention and therefore are simplified. The figures are not drawn to scale.

DESCRIPTION OF EMBODIMENTS

In AC railway systems electrically powered trains run along rails and receives electric energy from an electric power contact line. The contact line is arranged with a conducting surface at a substantially constant height along and above the railway to engage with a contact on the locomotive of each train travelling on the railway in order to power said trains by single phase AC current. Such a single phase system with power drawn by the locomotives at a travelling contact point induces harmonics in the contact line. The figures illustrate an apparatus and a method for active filtering of harmonics in a contact line of a railway by means of a multilevel converter, which converter includes two parallel branches of cascaded switching cells, preferably H-bridges equipped with energy storing elements in the form of capacitors, and which parallel branches have a common output at the connection to the railway power system.

Figure 1:
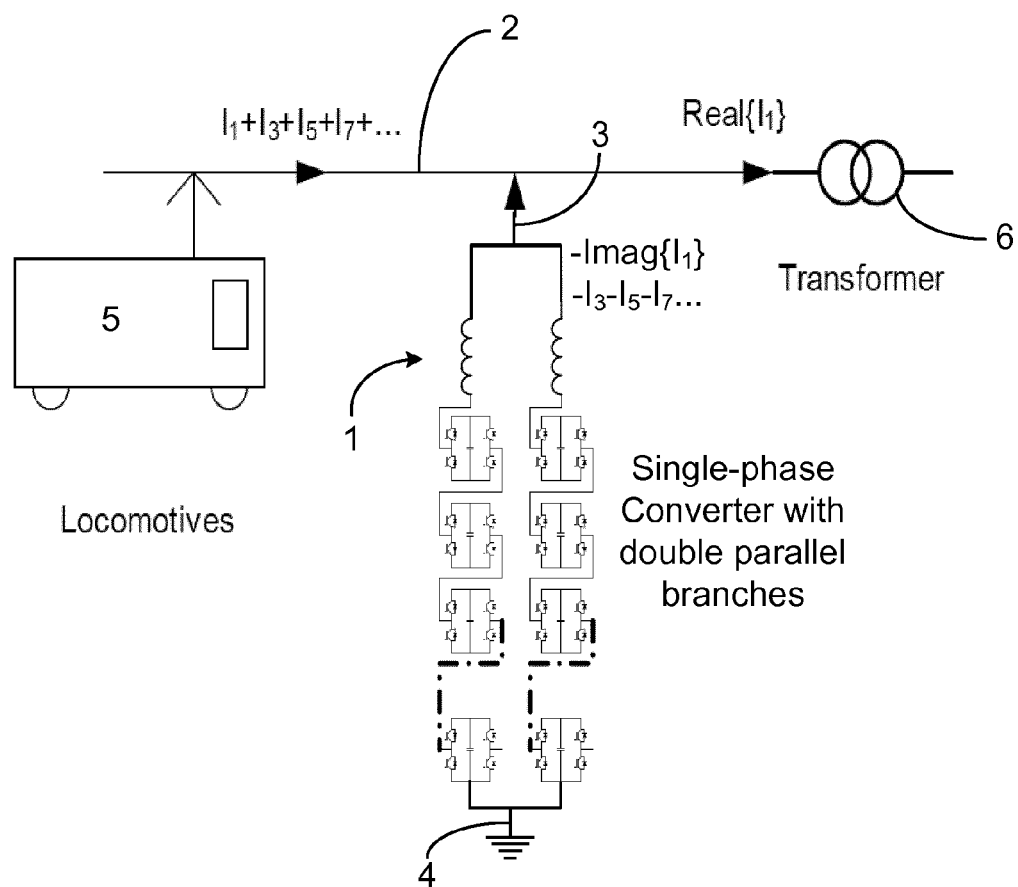
FIG. 1 illustrates a cascaded H-bridge multilevel voltage source converter compensating harmonics in a railway power contact line in accordance with the invention.

FIG. 1 illustrates an embodiment of a cascaded H-bridge multilevel converter according to the invention. The multilevel converter 1 is electrically connected in shunt to an electrical power transmitting contact line 2 of a railway. Power (current Real $\{I1\}$) is supplied by means of a transformer 6 to the contact line 2, and the power propels a locomotive 5 of a train on the railway rails along the contact line 2. The locomotive 5 produces harmonics $I_3, I_5, I_7 \ldots$ in the contact line as it moves along the railway, and introduces a phase shift in the current. The multilevel converter 1 has one end 3 connected to the contact line 2, and an opposite end 4 connected to ground. The multilevel converter 1 includes to parallel branches of cascaded H-bridge switching cells (illustrated further in FIGS. 2 and 3) and compensates for the phase shift (the reactive current Imag $\{I_1\}$ of the contact line) as well as for the harmonics ($I_3, I_5, I_7 \ldots$) by interacting with the contact line with a reactive power compensating current ($-\text{Imag}\{I_1\}$) and negative harmonics currents ($-I_3-I_5-I_7 \ldots$).

Figure 2:
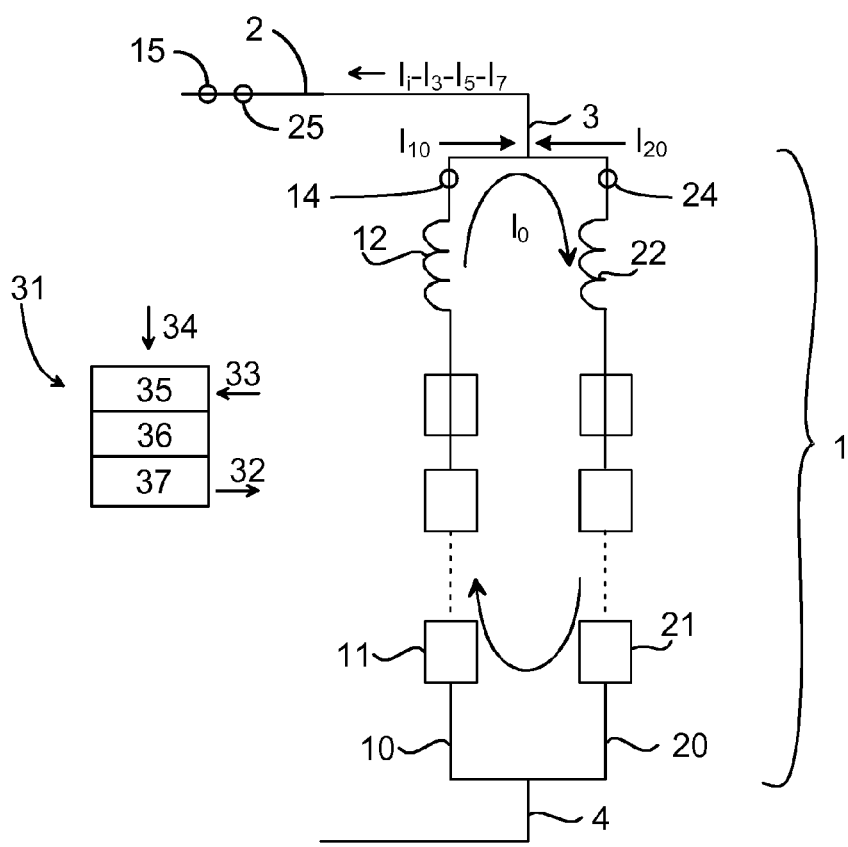
FIG. 2 illustrates a multilevel voltage source converter in accordance with the invention.

FIG. 2 illustrates a cascaded multilevel converter comprising one single phase leg 1. The phase leg comprises two branches 10, 20. The two branches 10, 20, of the phase leg 1 are interconnected in its ends, at the first end 3 having an output facing the railway contact line 2 and in the second opposite end facing the ground point 4. Each branch comprising serially arranged switching cells 11, 21. Each switching cell being individually controlled by a controller 31, said controller is provided with means for monitoring 33 and controlling 32 the converter, especially controlling the switching of the switching cells 11, 21, so as to create a current I supplied to the contact line of the railway, and for creating a circulating current $I_0$ that is not supplied to the power network and instead circulates in the two branches 10, 20 of the single phase leg 1. Each branch 10, 20 of the phase leg 1 also includes a reactor 12 and 22, respectively, which reactor 12, 22 is arranged in the contact line end of the corresponding branch. Each reactor 12, 22 functions as a smoothening reactor 12, 22 to even out the voltage steps of the power from the branches 10, 20. The current I supplied from the converter 1 consists of a reactive power current $I_i$ and "negative harmonics" or currents ($-I_3-I_5-I_7 \ldots$) of the respective harmonic frequencies counteraction the harmonics in the contact line.

The converter also includes a controller 31 operatively connected to the phase leg, especially operatively connected (indicated by arrows 32, 33) to the switching cells 11, 21 and includes means 33 for receiving information from and means 32 for transferring control signals to each switching cell 11, 21 individually. The controller 31 is adapted for monitoring the voltage ($V_{DC}$) of each switching cell 11, 21 and adapted for controlling 32 the switching of each cell 11, 21. The controller 31 is also arranged to monitor 34 the power of the contact line, especially monitoring the voltages and currents, by means of a voltage measuring device 15 and a current measuring device 25.

The controller 31 is adapted to control the phase leg to supply a current I to the power network by means of switching commands 32 transferred to the switching cells. Especially, the controller is arranged and adapted for receiving voltage and current measurements from voltage 15 and current measuring devices 16 arranged at the contact line 2, the controller 31 is adapted to determine the phase shift between the current and voltage and determine the reactive power in the contact line that needs to be compensated for. The controller 31 is also provided to control the switching cells 11, 21 to add reactive power that compensates the phase shift of the power in the contact line (2).

The controller 31 is also adapted to determine the harmonics $I_3, I_5, I_7 \ldots$ in the contact line from the received current or voltage measurement, and control the switching cells 11, 21 so that a counteracting current $-I_3-I_5-I_7 \ldots$ is created in the converter 1 and supplied to the contact line 2 via the output 3 of the two branches 10, 20.

The controller 31 is also adapted to control the phase legs (of each phase) to create a circulating current $I_0$ in the phase leg, which circulating current circulates in both branches 10, 20, from branch to branch via the ground connection 4 and the phase connection 3, without contributing to the current I supplied to the contact line 2.

The controller 31 of FIG. 2 comprises a combination of hardware and software to perform its functions including receiving measurement signals and transferring control signals, analysing the measurement signals and monitor reactive power, harmonics of the contact line and voltage levels and currents of the converter branches and also determine whether a voltage level of an energy storage element deviates from nominal ranges. For illustrating the main characteristics of the invention, the controller 31 is simplified in the FIG. 2. The controller 31 is exemplified as including a current and voltage monitoring part 35, an analysing part 36 and a switching cell controlling part 37. The controller 31 receives 34 the voltage and current in the power and contact line of the railway by means of the monitoring part 35. The controller 31 also receives 33 the cell voltages ($V_{DC}$) and currents $I_{10}, I_{20}$ in each branch 10, 20 of the converter leg 1 by means of the monitoring part 35. The analyser 36 is adapted to determine the reactive power, harmonics and cell voltage levels, and depending on the switching settings used, the controller 31 is adapted to adjust the switching control signals. For example, if an adjustment of the cell voltage levels is needed, i.e. of at least one energy storage element, the controller 31 starts transferring energy between the energy storage elements 11, 21 by for example adjusting the switching to receive electric energy in, or release energy from, the energy storage element in question. The controller 31 performs the switching of the cells by means of the switching controller 37, and if at least one voltage should be adjusted, the switching controller 37 adjusts the switching signals that are transferred to at least one of the switching cells 11, 21.

The monitoring includes measuring the capacitor voltage $V_{DC}$ of each switching cell 11, 21, and the currents created in each phase leg branch $I_{10}$ and $I_{20}$ respectively. From the measured currents $I_{10}$, and $I_{20}$, the controller 31 is adapted to determine the current I provided to the contact line by each respective phase leg 10, 20, and also the circulating current $I_0$. The current I to the contact line should equal the currents needed for compensating for the reactive power, i.e. and the harmonics compensating currents ($-I_3-I_5-I_7 \ldots$). Each branch of the phase leg includes means for monitoring the voltages and currents, such as current transformers 14, 24 for monitoring the respective branch currents $I_{10}, I_{20}$, and voltage transformers for monitoring each voltage level $V_{DC}$ of each energy storage element. The current exchange with the contact and transmission line 2 is monitored by means of voltage 15 and current measuring devices 25 such as current transformers for measuring the current $I_1$ and voltage transformers for measuring the contact line voltage.

Figure 3A:
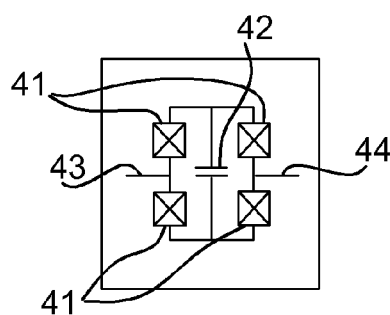
FIGS. 3a and 3b illustrate switching circuits including semiconductor switching elements, such as IGBTs, and energy storage devices in the form of capacitors.
Figure 3B:
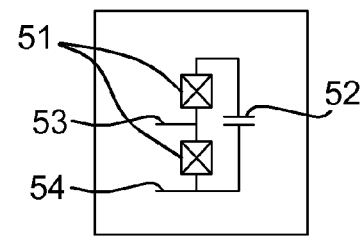

FIGS. 3a and 3b illustrates two embodiments of switching cells (11, 21) and corresponding energy storage elements that are suitable for any of the multilevel converter arrangements of FIGS. 1 and 2.

FIG. 3a illustrates an H-bridge (also referred to as a full bridge) switching cell. The H-bridge switching cell includes four IGBTs 41 including freewheeling diodes in anti-parallel relationship to each respective IGBT. Each cell includes input and output terminals 43, 44 for serial connection of switching cells to make up a branch of serially connected switching cells. A capacitor 42 is arranged as energy storage element, which is selectively connected to the input and output terminals 43, 44 by means of the IGBTs.

FIG. 3b illustrates a half bridge (also referred to as a half H-bridge) switching cell. It includes a capacitor 52 as energy storage element and two IGBTs 51 for selective connection of the energy storage element 52 to the terminals 53, 54 of the half bridge switching cell. Each switching cell of FIGS. 3a and 3b comprises its own energy storage element 42, 52, the voltage of which is monitored for deviations and subsequently adjusted by means of change of the switching signal pattern.

Figure 4:
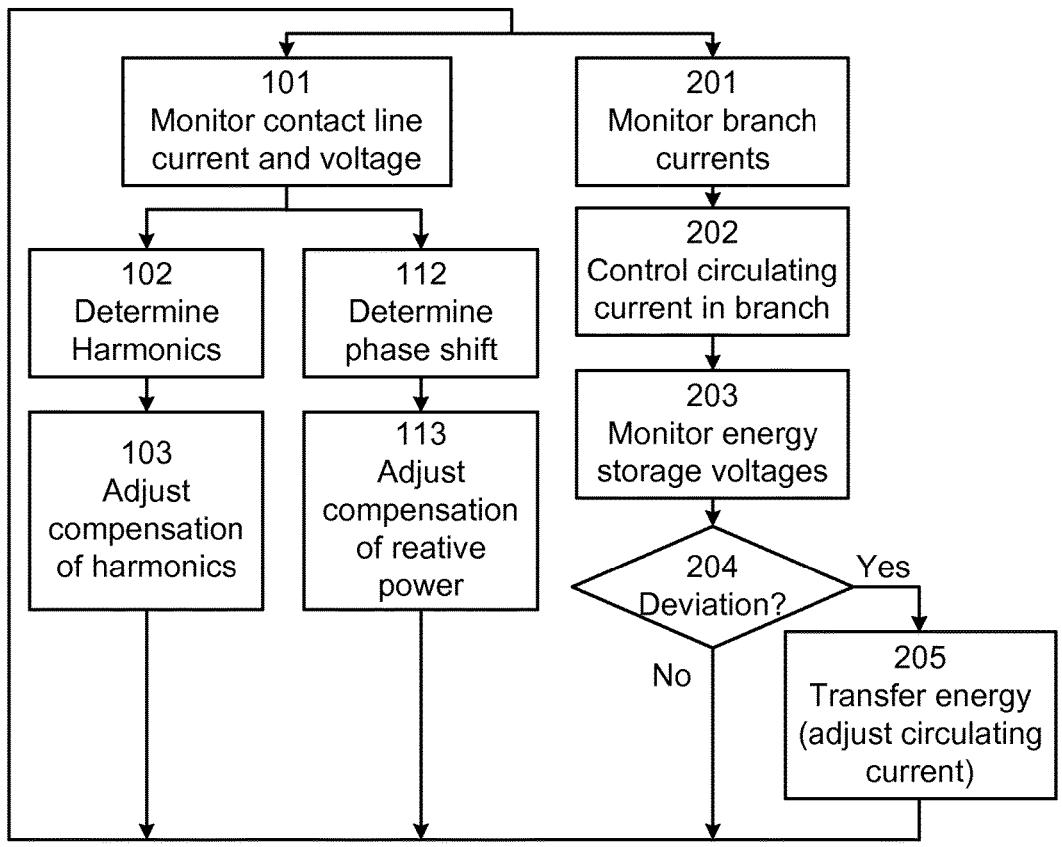
FIG. 4 illustrates a method for controlling a multilevel converter according to the invention, wherein the different functions are illustrated.

FIG. 4 illustrates a method for controlling the multilevel converter of the invention. The method is mainly intended for counteracting harmonics by active filtering of the harmonics from a contact and power transmission line of a railway. The method also provides balancing the DC voltages of the switching cells of the two branches of the single phase multilevel converters of FIGS. 1 and 2. The method includes primarily three main functions illustrated as three parallel sequences. The method includes a first sequence including controlling the multilevel converter to interact with the power network by filtering harmonics from the contact line, in steps 101-103, a second sequence including adjusting the DC voltages of the energy storage elements, in steps 201-205, and a third sequence of compensating for reactive power in the contact line, in steps 101, 112, 113.

Especially, the first sequence includes measuring 101 the voltage and/or current of the contact line. The first sequence continues with determining 102 the harmonic content of the measured current or voltage. This harmonic content determination may include the sub steps 102 a-e of determining each of a plurality of harmonics, one by one. Each one of these harmonic determination sub steps 102a-e include using a transform to extract one of the harmonics, such as using a Park's transform for extracting each one of a third, fifth, seventh, ninth and eleventh harmonic respectively. In the next step the created control signals are added together and the compensation of harmonics is adjusted 103, which means that a compensation is determined or that the harmonics compensation needed is added to the present harmonics compensation.

Figure 5:
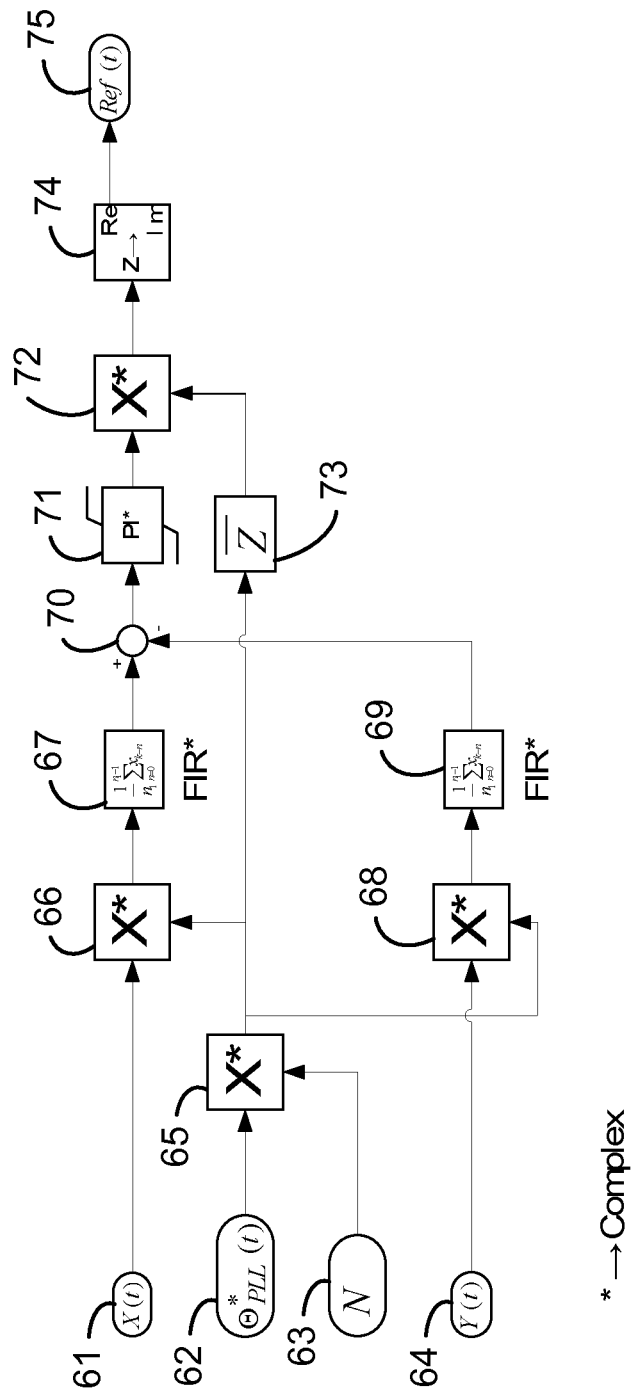
FIG. 5 illustrates the mathematical operations utilized for harmonics filtering according to the invention.

The harmonics compensation can be added together with the reactive power compensation before creating the control signal for the switching. This is illustrated in FIG. 5.

Returning to FIG. 4, the method also includes monitoring 203 the voltages of each energy storage element and, as a response to the monitoring, transferring 205 energy to, or from, an energy storage element whose voltage level deviates from predetermined voltage levels. This third sequence concerning balancing of DC voltages in the capacitors (or energy storage elements) of the two branches of switching cells of the converter may start with measuring the currents of the two branches, in step 201, which may be followed in the next step 202 with controlling a circulating current, i.e. the circulating current is started, or maintained, in the two branches as an idle current by affecting the switching timing to differ slightly between the two branches. The balancing method proceeds with monitoring the voltage levels of each energy storage element, in step 203, by means of the controller (31) monitoring the voltage measurements received (33) from the voltage measuring devices of each switching cell. In the following step 204 the controller (31) determines if the voltage level of any of the energy storage elements deviates from a nominal voltage level in step 204, and if one or more of the voltage levels deviate more than a predefined threshold, the method includes the step of transferring energy to or from the deviating energy storage element in step 205. This balancing is performed without interacting with the power network, so the balancing is performed without affecting the supply of current to or from the contact line. In this way the voltage level of every energy storage element can be kept within suitable limits even when there is no power interaction with the contact line, i.e. even when the converter do not compensate for reactive power by introducing a current to the contact line.

In more detail, step 202 of the method includes controlling the switching elements to create and provide a circulating current in the two branches of single phase leg of the converter. As indicated, this circulating current may suitably be provided as an idling current circulating in the branches, without adding or subtracting energy from any of the storage elements unless any of the storage elements should be balanced, i.e. upon detecting that an energy storage element deviates and, as a response to the detected deviation, balancing the energy storage element in question. The energy transfer step 205 is performed by adjusting the already circulating current to add or remove energy from a deviating switching cell so that the voltage levels of the energy storage elements are balanced. Thus, the controller is adapted to control the switching to create an idle current and to regulate the idle current so that the transfer of energy between the energy storage elements is effectuated.

A main function of the multilevel converter is to interact with the power transmitting contact line in order to compensate for reactive power; steps 101 and 112-113 describe this interaction. The method interacts with the contact line by monitoring the power in the contact line, in step 101, which includes monitoring the voltage and current of the contact line. Also, the interaction includes, in steps 112-113, controlling the reactive power that is supplied from the converter to the contact line of the railway.

FIG. 5 is a mathematical description in a functional diagram of creating a control signal for the switching of the switching cells. The harmonic current is used as an input (X(t)) and a reference signal ref(t) is created for the switching control. The figure illustrates filtering control using the harmonic current, but alternatively the harmonic voltage can be used by using the harmonic voltage as input (X) and input (Y) set to zero. The Park's transform X* is applied to the measured harmonic current X(t) using the harmonic of order N (Nth harmonic $\theta^*_{PLL}(t)$). The symbol "*" is used in the figure for complex functions. The transformed current is filtered FIR* from DC current and other AC harmonics. The next step is to compute the contribution of the Nth harmonic to the STATCOM current signal Y(t). For this purpose the Nth harmonic of the STATCOM current is subtracted from transformed and filtered harmonic current. The figure illustrate how the STATCOM current Y(t) prior to the subtraction has been transformed The PI* compute the contribution and the filtered harmonic contribution is transformed by the invers Park's transform Z. These steps are repeated for everyone of the harmonics N.

FIG. 5 illustrates further details of a specific STATCOM implementation in accordance with the invention. The different operations, for each harmonic to be compensated, can be applied as follows:

61 Sampled input current signal, from the contact line, X(t).

62 Reference angle (complex) of the Phase Lock Loop (PLL) which is synchronized to the voltage of the contact line.

63 Selecting N'th harmonic.

64 Sampled input current signal, from the STATCOM.

65 Complex multiplication.

66 Park's transformation, transforms current signal X(t) into the two axis (real, imaginary) rotating frame, rotating at the frequency of the N'th harmonic.

67 Filtering out (real and imaginary) N'th harmonic of transformed current signal (to be applied to the real part and imaginary part)

68 Park's transformation of STATCOM current Y(t).

69 Filtering out N'th harmonic of Y(t) (same as 67 but for STATCOM current).

70 Complex subtraction of N'th harmonic frequency components of Y(t) from N'th harmonic frequency component of input current X(t).

71 Proportional-Integral control (having the Laplace transform Kp+1/(sTi)).

72 Re-transformation of the result to signal (into two axis stationary frame).

73 Complex-conjugate of the PLL reference angle times N'th harmonic.

74 Extracting the real part from the complex input.

75 Current reference signal to the STATCOM, which subsequently is summed up with signals from other controls.

The invention has been described as a single phase converter, which is a cascaded multilevel converter, having H-bridge switching cells, and how such a converter is adapted for filtering harmonics in a power transmitting contact line of a railway. The topology of the converter provides a means for adjusting voltage unbalances in and between energy storage elements, such as capacitors, of the converter without negatively affecting the electric interaction with the contact line, and, thus, the invention avoids external filtering, i.e. filtering external to the converter. Such a converter may also be employed for active filtering, and/or reactive power control, in other applications than for a railway, for example in industrial applications for powering electric machinery.

The invention claimed is:

1. An apparatus for filtering harmonics in a power transmitting contact line of a railway, the apparatus comprising:
a multilevel converter having one single phase leg, the phase leg comprising switching cells, each switching cell comprising semi-conductor switches arranged to selectively provide a connection to a corresponding energy storage element,
wherein the multilevel converter includes a controller provided to control switching of each switching cell, wherein the phase leg is configured in two parallel branches of cascaded switching cells, the two parallel branches being interconnected in a closed circuit, and the controller is provided to monitor a content of the harmonics in the contact line, and is adapted to filter the monitored harmonics by adapting the switching of the switching cells to absorb the harmonics, and
wherein the controller is adapted to create a circulating current in the two parallel branches of the phase leg and adapted to modify the circulating current in the two parallel branches to transfer energy between the corresponding energy storage elements of at least two switching cells, upon detecting, during monitoring voltage levels of each of the corresponding energy storage elements, that at least one monitored voltage level deviates.

2. The multilevel converter according to claim 1, wherein the controller is adapted to monitor the voltage levels of each of the corresponding energy storage elements and is adapted to transfer the energy between the corresponding energy storage elements by controlling the switching of the switching cells in dependence of the voltage levels to compensate for voltage unbalances.

3. The multilevel converter according to claim 2, wherein the converter is adapted to compensate for reactive power to the contact line, and is adapted to maintain supply of the reactive power during the harmonics filtering.

4. The multilevel converter according to claim 2, wherein the controller is adapted to monitor the content of the harmonics in the contact line by applying a Park's transform to a measured voltage or current signal.

5. The multilevel converter according to claim 2, wherein the controller is adapted to employ an inverse Park's transform to provide a switching control signal for filtering the monitored harmonics.

6. The multilevel converter according to claim 1, wherein the controller is adapted to effectuate the transfer of energy between the corresponding energy storage elements by individually varying the switching of the switching cells.

7. The multilevel converter according to claim 1, wherein the corresponding energy storage element of at least one of the switching cells is a capacitor.

8. The multilevel converter according to claim 1, wherein the corresponding energy storage element of at least one of the switching cell is a battery.

9. The multilevel converter according to claim 1, wherein each switching cell comprises a full H-bridge with four semiconductor switching elements connected to the corresponding energy storage element.

10. The multilevel converter according to claim 1, wherein each switching cell comprises a half-bridge with two semiconductor switching elements connected to the corresponding energy storage element.

11. The multilevel converter according to claim 1, wherein the corresponding energy storage elements of a majority of the switching cells of each branch are capacitors.

12. The multilevel converter according to claim 1, wherein the multilevel converter is adapted to compensate for reactive power to the contact line, and is adapted to maintain supply of the reactive power during the harmonics filtering.

13. A method for controlling a single phase multilevel converter connected to a railway transmission and contact line, the multilevel converter comprising one phase leg, the phase leg comprising switching cells, each switching cell comprising semi-conductor switches arranged to selectively provide a connection to a corresponding energy storage element, and the phase leg comprises two parallel branches of switching cells, the two parallel branches sharing an output connected to the contact line, the method comprising steps of:
  monitoring harmonic content of power in the contact line;
  compensating for the harmonic content by controlling switching of the switching cells;
  creating a circulating current in the two parallel branches; and
  balancing voltages of the corresponding energy storage elements, wherein the balancing includes modifying the circulating current in the two parallel branches to transfer energy between the corresponding energy storage elements of at least two switching cells, upon detecting, during monitoring of voltage levels of each of the corresponding energy storage elements, that at least one monitored voltage level deviates.

14. The method for controlling the single phase multilevel converter according to claim 13, wherein the monitoring of the harmonic content includes employing a Park's transform for identifying a size and phase angle of each harmonic.

15. The method for controlling the single phase multilevel converter according to claim 14, wherein the Park's transform is employed on one harmonic at a time, and the harmonics that are compensated are monitored in sequence by the Park's transform.

16. The method for controlling the single phase multilevel converter according to 13, further comprising steps of:
  monitoring reactive power of the contact line; and
  compensating for the reactive power in the contact line by switching the cells to supply-a current to the contact line.

17. The method for controlling the single phase multilevel converter according to claim 16, wherein compensating for the harmonic content is maintained during the step of compensating for the reactive power.

* * * * *